United States Patent
Karlsson

[15] 3,671,014
[45] June 20, 1972

[54] DEVICE FOR FASTENING OF LOAD

[72] Inventor: Gote Sixten Karlsson, Masugnsbyn, Sweden

[22] Filed: Nov. 19, 1969

[21] Appl. No.: 878,040

[30] Foreign Application Priority Data

Nov. 21, 1968 Sweden..............................15837/68

[52] U.S. Cl. .................................................................254/51
[51] Int. Cl. ...............................................................B66f 1/00
[58] Field of Search ....................................254/51, 74–78; 105/368 T, 369 A; 280/179.1; 248/119, 361

[56] References Cited

UNITED STATES PATENTS

| 1,448,230 | 3/1923 | Mohrman | 254/78 |
| 1,579,579 | 4/1926 | Thompson | 254/78 |
| 3,176,843 | 4/1965 | Hoskins et al. | 254/51 |
| 3,271,007 | 9/1966 | Ratcliff | 254/78 |

Primary Examiner—Othell M. Simpson
Attorney—Irving M. Weiner

[57] ABSTRACT

A device for tensioning and fastening a flexible elongated member, such as a chain or wire. A frame has a pressure bellows and a lever mounted thereon. The pressure bellows is operatively connected to the lever by a shank member whereby the stroke of the pressure bellows is multiplied by the leverage ratio of the lever so that the free end of the lever goes through a increased stroke to tension a flexible elongated member attached to the free end of the lever.

10 Claims, 6 Drawing Figures

DEVICE FOR FASTENING OF LOAD

The invention relates generally to a device for tensioning and fastening a flexible elongated member. In particular, the invention relates to a device for fastening loads on trucks, wherein a flexible elongated member, such as a chain, wire, rope or the like is attached to the load on one side of the vehicle, is carried over the load to the other side of the vehicle, and is coupled, possibly via a pulley, to a tensioning device.

Many accidents and threats of accidents have occurred because of the fact that the whole or parts of the load have slipped and fallen down. An unusually high accident rate has been exhibited by timber-loaded vehicles. The usual procedure in such case is that the load is held with chains fastened across the load from one side of the load to the other. The chains are fastened after completion of the loading. During the journey, however, the load shakes down so that the enclosed volume diminishes and the chains slacken. Single logs may then often slip without the driver noticing the fact.

According to the present invention, these drawbacks are avoided and the advantage is gained that at a slight cost a robust and secure fastening and securing device is obtained which causes automatic tightening also during transport.

In this connection certain trailers are known which are driven over a load of timber lying on a chain, after which the ends of the chain are secured to a hook. The hook is arranged on the piston rod of a hydraulic cylinder. The chain is tensioned by the hydraulic cylinder and the load is raised to the underside of the vehicle. Similar arrangements are known in which several cables are used, one end of the cables being attached to a common chain. The chain has a hook which can be coupled to a winch on the towing vehicle. A chain locking device may be provided to relieve the winch of the weight of the load during transport when the load is suspended in the cables under the vehicle. Devices of this kind operate effectively only over short distances, for example, for hauling timber from the cutting site to a stock pile. It may also be difficult to place the chain under the load.

Another known procedure is to arrange a powerful spring in such cables or chains in order to take up some slack. Obviously, however, it is difficult to achieve a long length of spring travel. Furthermore the cable tension varies with the tension of the spring. Automatic take-up of slack with a reasonable tension is not possible with this known device.

A device is also known for fastening loads to trucks, wherein a chain, wire, rope, or the like is attached to one side of the vehicle, is taken across the load to the opposite side of the vehicle, and is coupled to a tensioning device consisting of a winch barrel with disengageable reverse stop. This device is made up of a feeder with a pawl or the like which, for tightening of the tensioning device, is brought into engagement with the winch barrel and is movable between two end positions; a piston cylinder device which is mechanically coupled to the feeder; a control device which in or close to one or the other end positions of the feeder causes the working medium to flow in and out of the piston cylinder device for driving of the winch barrel; and of a disengaging device for the reverse stop and pawl of the feeder jointly or separately.

SUMMARY OF THE INVENTION

The present invention provides a device for tensioning and fastening a flexible elongated member. The device includes a frame structure, and a pressure bellows connected to the frame structure. A bearing is connected to the frame structure. The device also includes a lever having a first end thereof adapted to be attached to the flexible elongated member having a second end thereof fulcrumed to the bearing. A rigid shank member has one end thereof connected to the pressure bellows, and has another end thereof articulatedly connected to the lever at a position along the lever which is closer to the second end of the lever than to the first end of the lever. Movement of the pressure bellows imparted to the rigid shank member is multiplied by the leverage ratio of the lever to cause the first end of the lever to move through a greater distance resulting in a tensioning of the flexible elongated member.

An object of the present invention is to produce a cheap and functionally satisfactory device of simple construction for fastening and automatic tightening of loads on trucks. The invention is based on the realization that a stroke of about 0.5 m should suffice in the great majority of cases and that a very cheap, compact, long-life, strong and, in itself, elastic driving device is achieved by using a bellows to which pressure can be supplied (hereinafter referred to as a pressure bellows) which produces the necessary stroke with the aid of a lever.

The device according to the invention is characterized by the fact that the tensioning device consists of a pressure bellows, which is articulatedly connected to a pivoted single- or double-armed lever, one free end of which has a device for attachment, hooking or the like of the chain, wire, rope or the like, the leverage ratio being such that the length of stroke of the pressure bellows is multiplied.

In the event of a fault in the pneumatic or hydraulic device of the vehicle, the problem arises in respect of the object of the invention to prevent slackening of the wire, chain, rope, or the like holding the load owing to the absence of the compressed air or the like. In one embodiment of the invention, this is achieved by arranging a mechanical reverse stop which prevents return movement of the lever, e.g., in the form of a spring-loaded, manually disengageable pawl.

The pressure bellows may consist of a specially manufactured reinforced rubber bellows. In the cases of small series a reduction of cost can be achieved according to the invention if use is made of a reinforced rubber hollow body, manufactured in large standard series for other purposes, e.g., in the form of car tires, scooter tires, wheelbarrow tires, go-cart tires or the like.

In rubber bellows of this kind problems may arise in the compression of the bellows to starting position prior to a working stroke since the bellows work solely as a single-acting piston cylinder device which does not itself fully return to starting position. This problem can be eliminated according to the invention by arranging a helical spring or other spring which is tensioned during the working stroke, or by arranging two bellows working in opposite directions.

BRIEF DESCRIPTION OF THE DRAWING

The invention will now be explained in greater detail with reference to the attached drawing which shows some of its embodiments in side elevation.

DETAILED DESCRIPTION OF SOME PREFERRED EMBODIMENTS OF THE INVENTION

Figure 1:
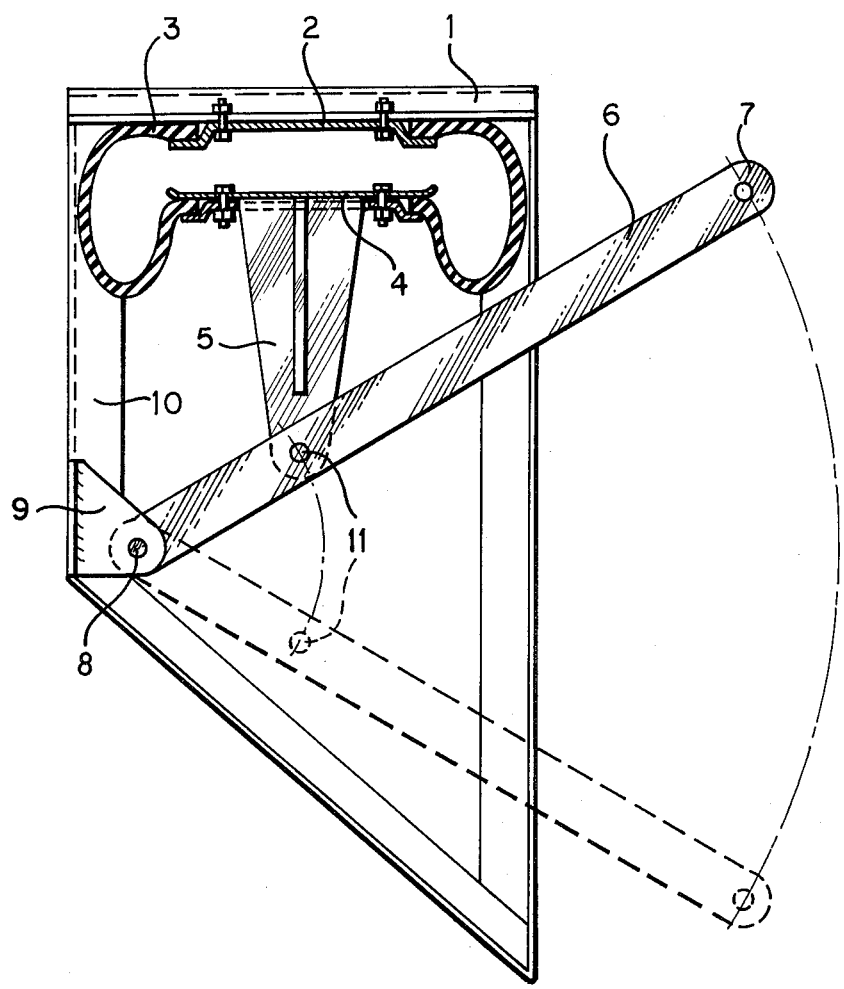
FIG. 1 shows the device according to the invention in elementary form.

FIG. 1 shows a basic form of the present invention. On a frame structure with a horizontal frame or plate 1, there is attached by screws a fastening device 2 for one bead of the pressure bellows 3. The latter has the form of a rubber tire the other bead of which is airtightly held by a rim- or piston-like device. This piston-like device 4 has a stiff shank 5 the free end of which at 11 is articulatedly or pivotally connected to a single-armed lever 6. The free end 7 of the lever 6 describes a curved movement around the fulcrum 8 of the lever in a bearing 9 when the pressure medium is supplied to or removed from the pressure bellows 3. The bearing 9 is attached to one vertical portion 10 of the frame structure.

The entire device is intended preferably for attachment to a truck with the horizontal frame 1 against the underside of the truck platform or timber bunk and/ or with the vertical portion against the longitudinal web of the frame side member so that the lever is movable in a vertical plane. The device can, however, also be mounted so that the lever is movable in a horizontal plane or an inclined plane, in which case a pulley device for the wire, chain, rope, or the like is additionally required. Other methods of mounting are also possible.

On swinging of the lever 6, the articulating joint 11 between the shank 5 and the lever 6 describes a curved movement as a result of which, in addition to its movement in an axial direction, the shank performs also a rocking lateral movement. Using a conventional piston cylinder device, this would require an articulated attachment of the driver unit. Through the use of a bellows according to the invention, on the other hand, attachment can be effected more cheaply and simply by rigid clamping, the flexibility of the bellows being instead used to permit rocking movements of the shank.

Figure 2:
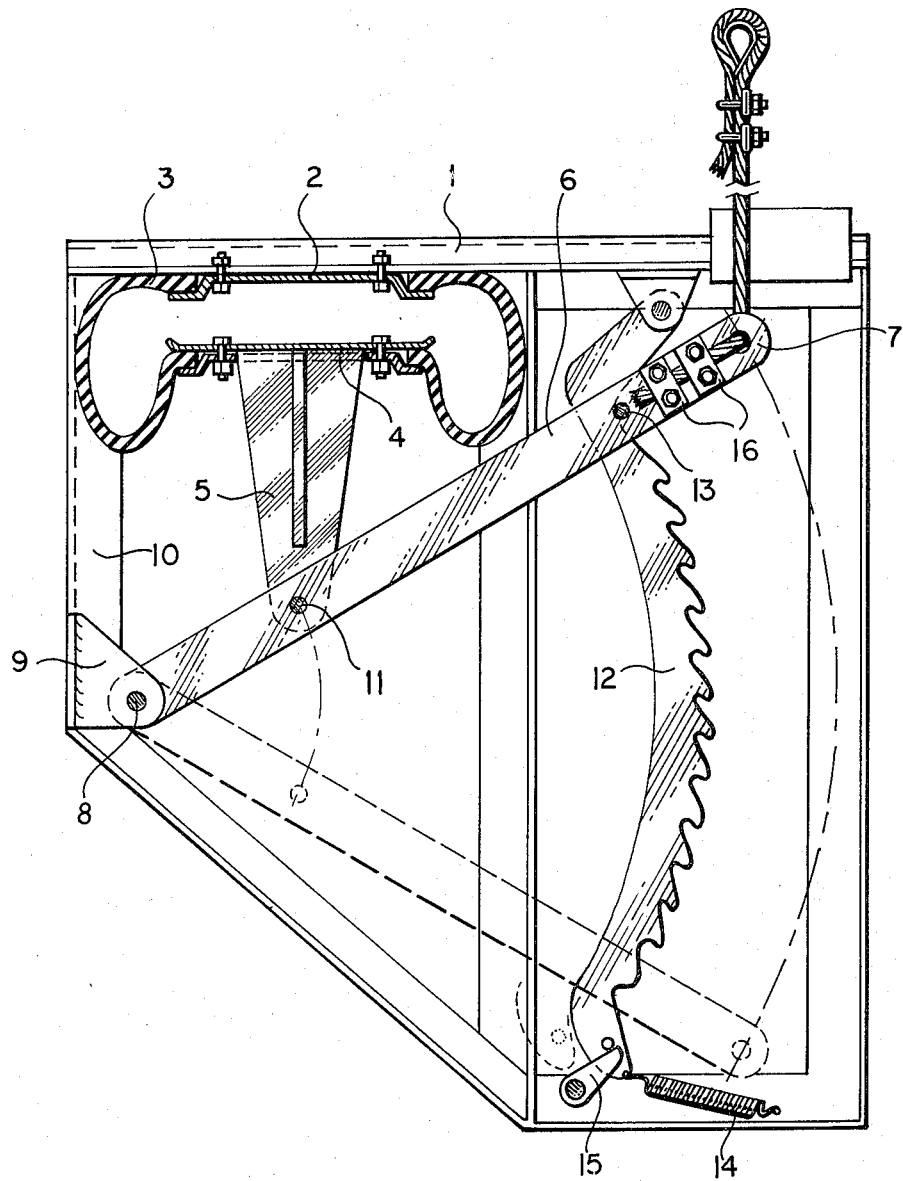
FIG. 2 illustrates the same device, supplemented by a reverse stop.

The free end 7 of the lever 6 may be formed, for example, with a hook for hooking to a chain link, wire eyelet or the like, or with a clamp 16 as shown in FIG. 2. Other forms are also conceivable within the scope of the invention, e.g., other clamps which allow attachment of a steel wire rope in any position.

The device according to FIG. 1 is dependent on the supply of the pressure medium to prevent return of the lever to its starting position under load. FIG. 2 shows a further development in this respect by arrangement of a reverse stop, here in the form of a toothed arc 12 and a projection 13 arranged on the lever 6 and engaging between the teeth. The toothed arc 12 is pivoted on the horizontal portion 1, is spring-loaded by means of a spring 14, and is disengageable by means of a manual disengaging device 15.

Figure 3:
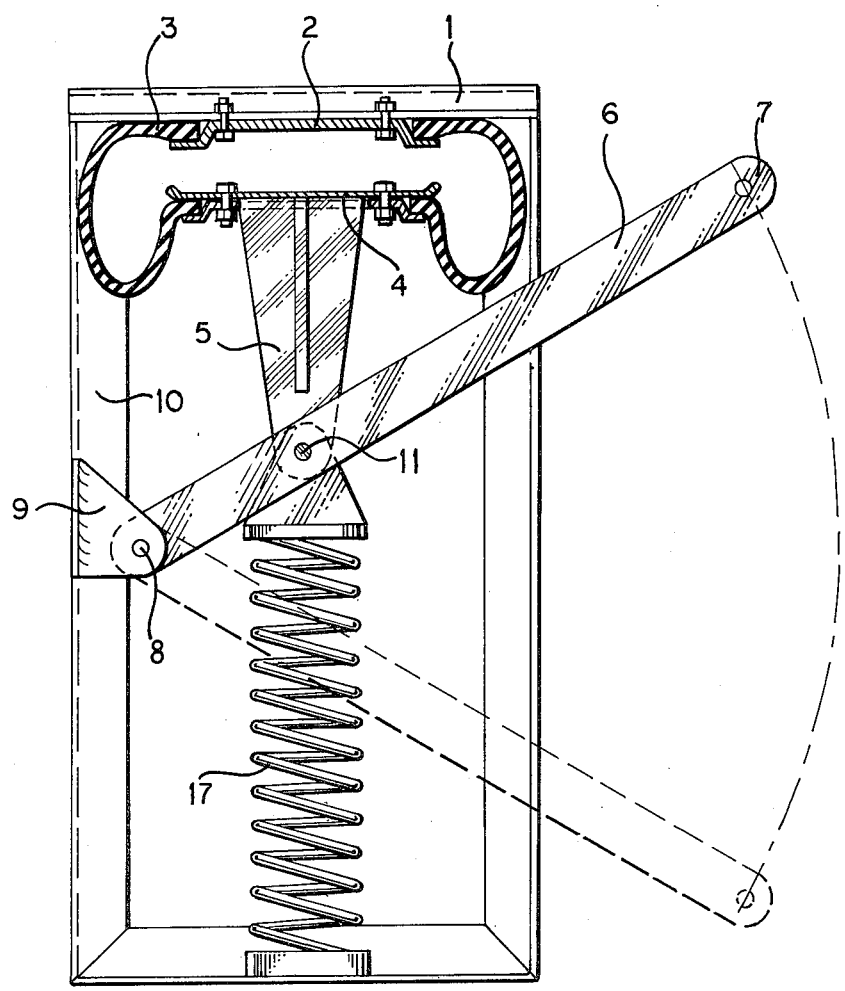
FIG. 3 depicts the device according to FIG. 1 with a helical spring.
Figure 4:
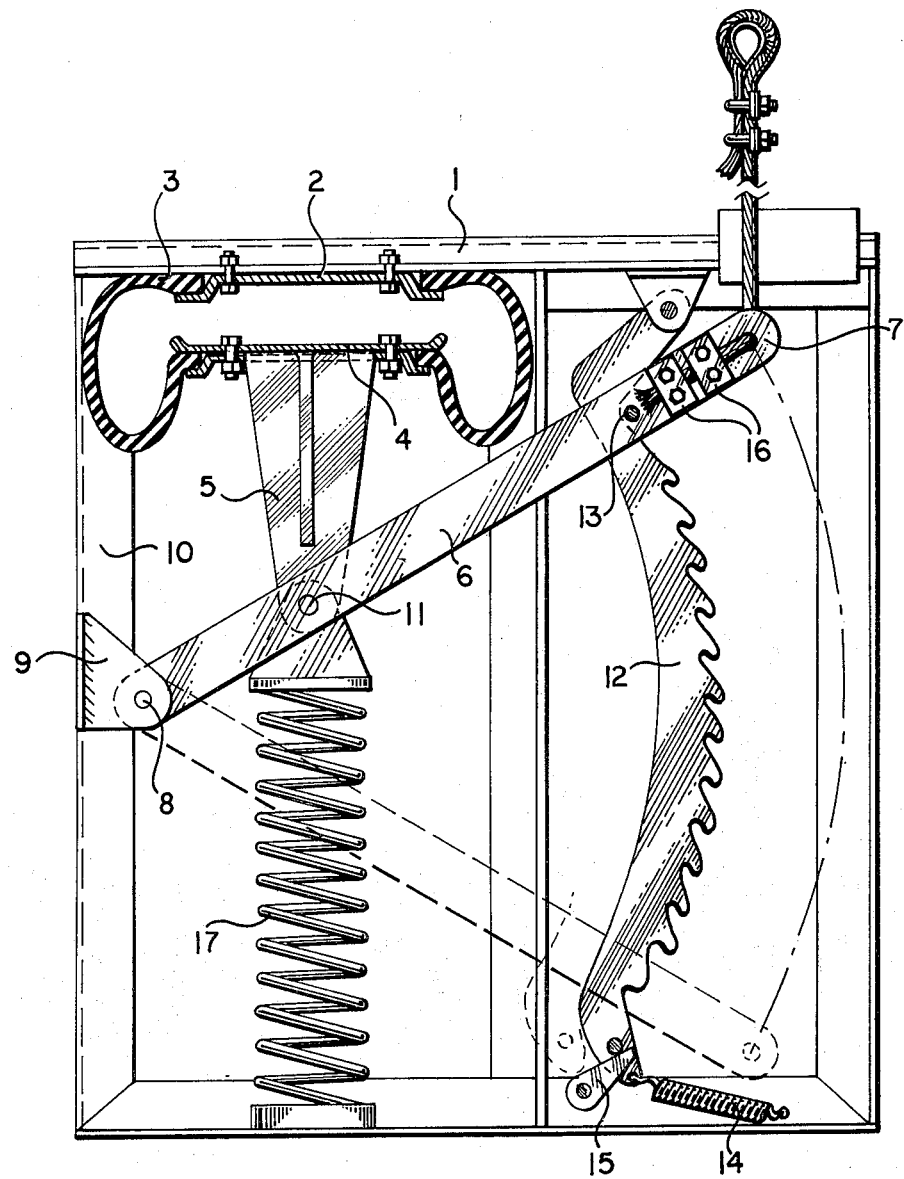
FIG. 4 shows the device according to FIG. 3 with a reverse stop.

In the embodiment in Fig. 3, the device in FIG. 1 has been provided with a helical spring 17, one end of which engages with the articulation link 11 on the lever 6, and the other end of which engager with the part of the modified frame structure opposite the bellows 3. This embodiment can also be supplemented by a reverse stop similar to the FIG. 2 embodiment as shown in FIG. 4.

Figure 5:
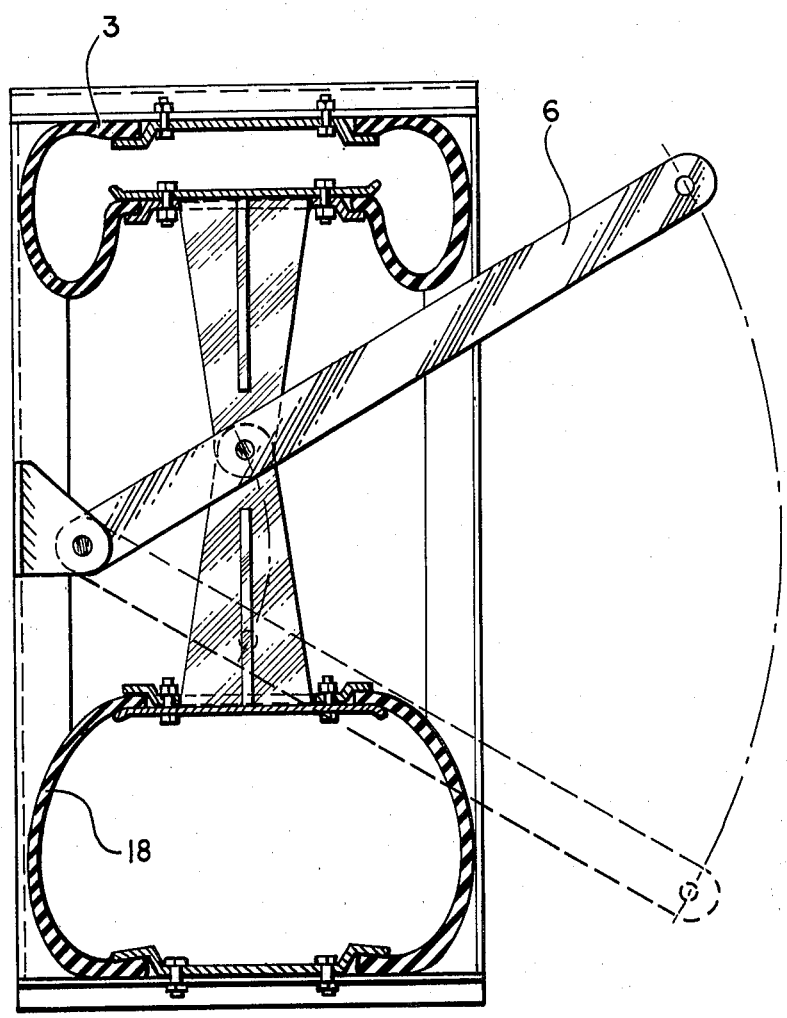
FIG. 5 illustrates the device according to FIG. 4 with two bellows working in opposite directions.
Figure 6:
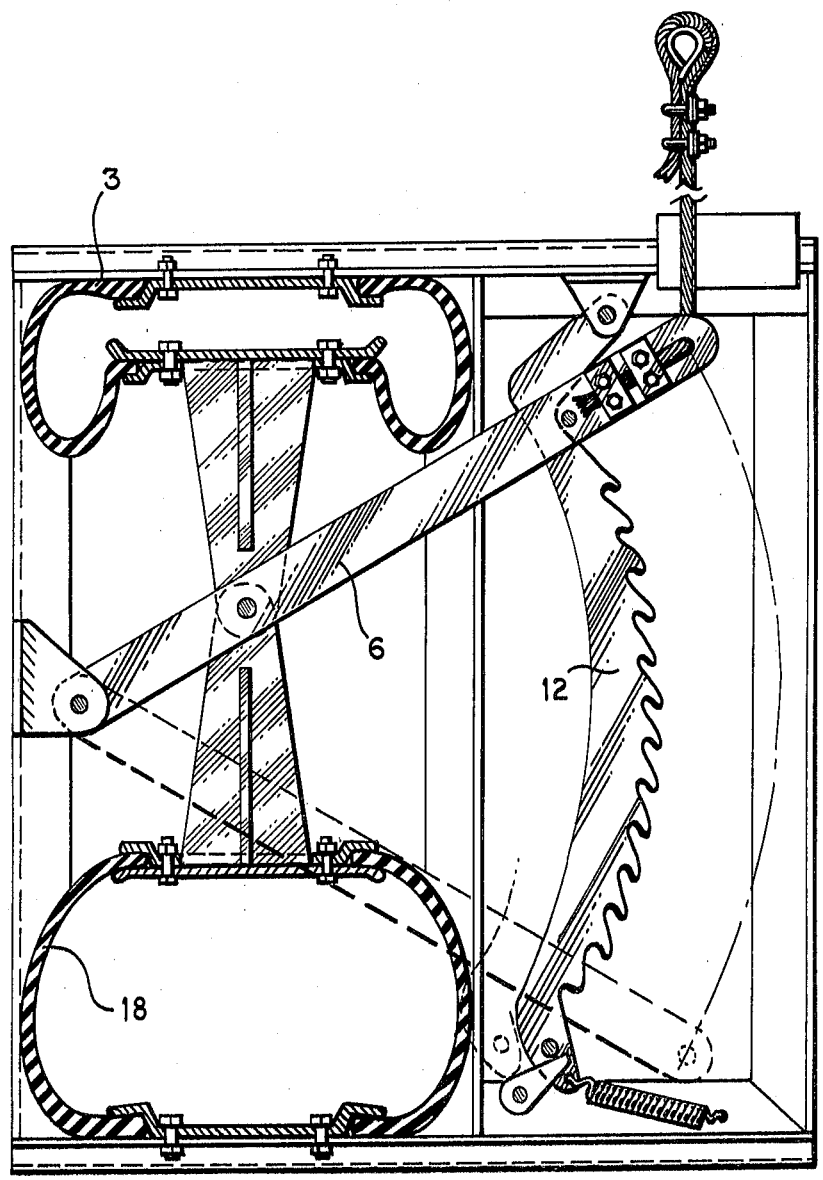
FIG. 6 depicts the device according to FIG. 5 with a reverse stop.

Another means of returning the lever 3 to starting position is to arrange a second pressure bellows 18 working in the opposite direction to the first pressure bellows 3, as shown in FIG. 5. FIG. 6, finally, shows this device supplemented by the same reverse stop as shown in FIG. 2, whereby, in addition to the advantages described in connection therewith, the further advantage is gained that once a tightened position of the arm is attained it is retained even if forces acting in the return direction considerably exceed the tractive force attained through the pressure bellows 3 through the leverage ratio of the lever 6.

At a leverage ratio of 1:4, a desired tractive force of, for example, 1 ton, and a working gauge pressure of 7 atmospheres, a "piston diameter" of only about 18 cm is required, which can be easily achieved and at a relatively extremely low cost, compared, for example, with hydraulic or pneumatic cylinders, by means of aforesaid rubber tires and similar standard products.

None of the drawings shows how the pressure medium is supplied and removed, as this lies outside the scope of the invention and is a trivial matter for the expert.

Although the invention has been described with reference to some of its embodiments,it can be varied within the scope of the subsequent claims.

I claim:

1. A device for tensioning and fastening a flexible elongated member, comprising, in combination:
    a frame structure;
    a pressure bellows connected to said frame structure:
    a bearing connected to said frame structure;
    a lever having a first end thereof adapted to be attached to said flexible elongated member and having a second end thereof fulcrumed to said bearing;
    a rigid shank having one end thereof connected to said pressure bellows and having another end thereof articulatedly connected to said lever at a position along said lever which is closer to said second end of said lever than to said first end of said lever;
    whereby movement of said pressure bellows imparted to said rigid shank member is multiplied by the leverage ratio of said lever to cause said first end of said lever to move through a greater distance resulting in a tensioning of said flexible elongated member.

2. A device for tensioning and fastening a flexible elongated member characterized in accordance with claim 1, further comprising:
    connecting means affixed to said lever in the vicinity of said first end thereof for interconnecting said lever and said flexible elongated member;
    disengagable mechanical stop means secured to said frame structure for preventing movement of said lever toward said pressure bellows;
    said stop means including a toothed sector one end of which is pivotally affixed to said frame structure and the other end of which is connected to said frame structure by a spring, a manually disengagable pawl pivotally affixed to said frame structure and arranged to engage with a projection on said toothed sector in the vicinity of the end of said toothed sector interconnected to said frame structure by said spring, and a projection element affixed to said lever and capable of being engaged between the teeth of said toothed sector.

3. A device for tensioning and fastening a flexible elongated member in accordance with claim 1, wherein said pressure bellows includes a reinforced rubber hollow body.

4. A device for tensioning and fastening a flexible elongated member in accordance with claim 2, wherein said pressure bellows includes a reinforced rubber hollow body.

5. A device for tensioning and fastening a flexible elongated member characterized in accordance with claim 1, further comprising:
    a spring member having one end thereof affixed to said frame structure remote from said pressure bellows, and having another end thereof connected to said lever at said position along said lever which is closer to said second end of said lever than to said first end of said lever;
    whereby said spring member urges said lever to move toward said pressure bellows.

6. A device for tensioning and fastening a flexible elongated member characterized in accordance with claim 1, further comprising:
    a second pressure bellows connected to said frame structure remote from said first-mentioned pressure bellows;
    a second rigid shank member having one end thereof connected to said second pressure bellows and having another end thereof articulatedly connected to said lever at said position along said lever which is closer to said second end of said lever than to said first end of said lever;
    whereby said second pressure bellows is arranged to be compressed when said first-mentioned pressure bellows is expanded upon being supplied with a pressure medium, and said first-mentioned pressure bellows is arranged to be compressed when said second pressure bellows is expanded upon being fed with a pressure medium.

7. A device for tensioning and fastening a flexible elongated member characterized in accordance with claim 2, further comprising:
    a spring member having one end thereof affixed to said frame structure remote from said pressure bellows, and having another end thereof affixed to said lever at said position along said lever which is closer to said second end of said lever than to said first end of said lever;
    whereby said spring member urges said lever to move toward said pressure bellows.

8. A device for tensioning and fastening a flexible elongated member characterized in accordance with claim 2, further comprising:
- a second pressure bellows connected to said frame structure remote from said first-mentioned pressure bellows;
- a second rigid shank member having one end thereof connected to said second pressure bellows and having another end thereof articulatedly connected to said lever at said position along said lever which is closer to said second end of said lever than to said first end of said lever;
- whereby said second pressure bellows is arranged to be compressed when said first-mentioned pressure bellows is expanded upon being fed with a pressure medium, and said first-mentioned pressure bellows is arranged to be compressed when said second pressure bellows is expanded upon being fed with a pressure medium.

9. A device for tensioning and fastening a flexible elongated member characterized in accordance with claim 3, further comprising:
- a spring member having one end thereof affixed to said frame structure remote from said pressure bellows, and having another end thereof connected to said lever at said position along said lever which is closer to said second end of said lever than to said first end of said lever;
- whereby said spring member urges said lever to move toward said pressure bellows.

10. A device for tensioning and fastening a flexible elongated member characterized in accordance with claim 3, further comprising:
- a second pressure bellows connected to said frame structure remote from said first-mentioned pressure bellows;
- a second rigid shank member having one end thereof connected to said second pressure bellows and having another end thereof articulatedly connected to said lever at said position along said lever which is closer to said second end of said lever than to said first end of said lever;
- whereby said second pressure bellows is arranged to be compressed when said first-mentioned pressure bellows is expanded upon being fed with a pressure medium, and said first-mentioned pressure bellows is arranged to be compressed when said second pressure bellows is expanded upon being fed with a pressure medium

* * * * *